United States Patent [19]

Takahashi et al.

[11] Patent Number: 4,594,401

[45] Date of Patent: Jun. 10, 1986

[54] OXYGEN PERMEABLE HARD CONTACT LENS FORMED FROM STYRENE MONOMER CONTAINING A SILYL OR SILOXANE GROUP

[75] Inventors: Kozo Takahashi, Aichi; Yasuharu Tahaka, Migumo; Kenichi Isobe; Shoji Ichinohe, both of Annaka, all of Japan

[73] Assignees: Shin-Etsu Chemical Co., Ltd., Tokyo; Toyo Contact Lens Co., Ltd., Nagoya, both of Japan

[21] Appl. No.: 686,876

[22] Filed: Dec. 27, 1984

[30] Foreign Application Priority Data

Dec. 28, 1983 [JP] Japan .................... 58-251106

[51] Int. Cl.$^4$ .................... C08F 30/08; C08F 130/08; C08F 230/08

[52] U.S. Cl. .................... 526/279; 523/107

[58] Field of Search .................... 523/107; 526/279

[56] References Cited

U.S. PATENT DOCUMENTS

| 2,982,757 | 5/1961 | Lewis | 526/279 |
| 4,153,641 | 5/1979 | Deichert et al. | 526/279 |
| 4,424,328 | 1/1984 | Ellis | 526/279 |

Primary Examiner—Joseph L. Schofer
Assistant Examiner—Peter F. Kulkosky
Attorney, Agent, or Firm—Armstrong, Nikaido, Marmelstein & Kubovcik

[57] ABSTRACT

An oxygen permeable hard contact lens having an improved oxygen permeability and an improved hardness and rigidity and an improved refractive index, made of a polymer comprising a styrene containing a silyl or siloxanyl group having at most 15 silicon atoms.

13 Claims, No Drawings

OXYGEN PERMEABLE HARD CONTACT LENS FORMED FROM STYRENE MONOMER CONTAINING A SILYL OR SILOXANE GROUP

BACKGROUND OF THE INVENTION

The present invention relates to hard contact lenses having an excellent oxygen permeability.

Contact lenses put presently on the market are classified into two large groups, i.e. soft contact lenses made of a hydrophilic polymer having a 2-hydroxyethyl methacrylate as a main component or a soft hydrophobic polymer such as silicone rubber, and hard contact lenses made of a hard polymer such as polymethyl methacrylate. The hard contact lenses are generally inferior in wearing sensation to the soft contact lenses, but they have excellent visual power correcting effect and durability and also have the characteristic advantages in the hard contact lenses such as easiness in handling, and accordingly they are widely used at present.

Hard contact lenses made of a polymethyl methacrylate have the fatal defect that it is difficult to supply oxygen required in metabolism of corneal tissue (the iris of the eye) from the atmosphere to cornea through the lens materials, in other words, the oxygen permeability is bad. Consequently, wearing of the hard contact lenses for a long period of time causes metabolic trouble of the corneal tissue.

In recent years, however, the above problem has been dissolved to some extent by appearance of an oxygen permeable hard contact lens made of a copolymer of methyl methacrylate and a special methacrylate compound having a silyl or siloxanyl group (Si—O bond) in its molecule (hereinafter referred to as "silicone-containing methacrylate"), and the hard contact lenses have rised in clinical estimation.

However, the proposed copolymer of the methacrylate compound having a silicone is inferior in hardness and rigidity to polymethyl methacrylate used as a material of usual hard contact lenses, and also is fragile. Lack of hardness and rigidity makes it easy to take scratches on the lens surface, bad in durability and makes it difficult to prepare contact lenses of a constant quality according to a predetermined lens contour.

Accordingly, in order to obtain oxygen permeable hard contact lenses having hardness and rigidity desired for hard contact lenses, the proportion of methyl methacrylate must be increased while decreasing the proportion of the above-mentioned silicone-containing methacrylate compound, which has relatively low hardness. But, this results in falling into the dilemma that the oxygen permeability of the obtained copolymer is decreased.

Besides, it is preferable to use the materials having the high refractive index for improving the wearing sensation by making the contact lens thinner.

SUMMARY OF THE INVENTION

Resulting of making study ernestly to eliminate the disadvantages in a conventional technique, the present inventors have found the remarkable fact that an oxygen permeable hard contact lens, which has high oxygen permeability, hardness, rigidity and refractive index, can be obtained by employing a styrene having a silyl or siloxanyl group as a main component of the said contact lens instead of, or adding to, the former silicon-containing methacrylate or acrylate, and then, they have accomplished the present invention.

The present invention relates to an oxygen permeable hard contact lens made of a polymer comprising a styrene containing a silyl or siloxanyl group having at most 15 silicon atoms.

DETAILED DESCRIPTION

Though there are various kind of styrenes having a silyl or siloxanyl group depending upon the structure of a portion of the silyl or siloxanyl group, the styrene containing a silyl or siloxanyl group having at most 15 silicon atoms (hereinafter reffered to as "silicone-containing styrene") used in the present invention includes, for instance, a compound of the general formula (I):

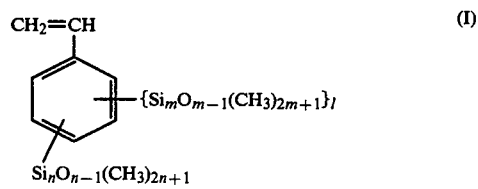

wherein l is 0 or 1, and n and m is an integer of 1 to 15.

In the compound represented by the formula (I) mentioned above, the compound in which l is 0 is preferable to the compound in which l is 1, since the former is easy to synthesize and stable. Also, the product becomes soft and fragile with increasing the number of n or m. As to n and m, when the number of n or m is 1 to 5, the material of contact lens, which has especially desirable oxygen permeability, excellent hardness and rigidity, and high refractive index, can be obtained.

At the portion of the siloxanyl group in the compound represented by the formula (I), either a linear or branched siloxanyl group can be employed, preferably the branched one, since the branched one gives a harder product than the straight one.

Typical examples of the compounds represented by formula (I) are, for instance, trimethylsilylstyrene, pentamethyldisiloxanylstyrene, heptamethyltrisiloxanylstyrene, nonamethyltetrasiloxanylstyrene, pentadecamethylheptasiloxanylstyrene, heneicosamethyldecasiloxanylstyrene, heptacosamethyltridecasiloxanylstyrene, hentriacontamethylpentadecasiloxanylstyrene, bis(trimethylsiloxy)methylsilylstyrene, tris(trimethylsiloxy)silylstyrene, trimethylsiloxy-pentamethyldisiloxy-methylsilylstyrene, tris(pentamethyldisiloxy)silylstyrene, (tris-trimethylsiloxy)siloxanyl-bis(trimethylsiloxy)silylstyrene, bis(heptamethyltrisiloxy)methylsilylstyrene, tris(methylbis-trimethylsiloxysiloxy)silylstyrene, trimethylsiloxy-bis(tris-trimethylsiloxy-siloxy)silylstyrene, heptakis(trimethylsiloxy)trisiloxanylstyrene, nonamethyltetrasiloxy-undecylpentasiloxy-methylsilylstyrene, tris(tris-trimethylsiloxy-siloxy)silylstyrene, (tristrimethylsiloxyhexamethyl)tetrasiloxy-(tris-trimethylsiloxy)siloxytrimethylsiloxysilylstyrene, nonakis(trimethylsiloxy)tetrasiloxanylstyrene, bis(tridecamethylhexasiloxy)methylsilylstyrene, and the like. These compounds may be employed alone or in admixture thereof.

Among these compounds mentioned above, more preferable ones are, for instance, trimethylsilylstyrene represented by the formula:

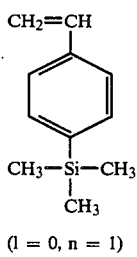

bis(trimethylsiloxy)methylsilylstyrene represented by the formula:

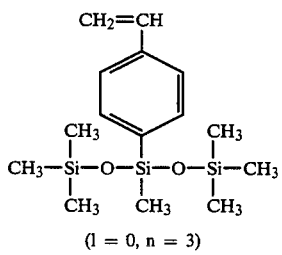

and tris(trimethylsiloxy)silylstyrene represented by the formula:

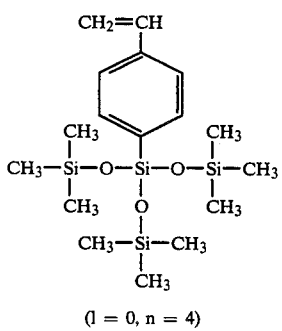

Further, examples of the silicone-containing styrene used in the present invention are the compounds which have cyclic structure at the portion of the siloxanyl group, for instance, heptamethylcyclotetrasiloxanylstyrene, heptamethylcyclotetrasiloxybis-(trimethylsiloxy)-silylstyrene, tripropyltetramethylcyclotetrasiloxanylstyrene, and the like. The compounds may be employed alone or in admixture thereof.

The above-mentioned silicone-containing styrene used in the present invention is excellent in mechanical shaping in case that the lenses are processed by cutting or polishing. Therefore, it is possible to employ it over a very wide field.

Silicone-containing styrene used in the present invention may be polymerized alone or copolimerized with other monomer. The obtained polymers are an excellent material of oxygen permeable hard contact lens having high oxygen permeability, hardness and rigidity, and moreover, high refractive index in comparison with a conventional one.

As occasion demands, a cross-linking monomer is employed for increasing of the chemical resistance and stabilizing the lens contour and dimension of the obtained polymer. Representative examples of ethylene glycol dimethacrylate, ethylene glycol diacrylate, diethylene glycol dimethacrylate, diethylene glycol diacrylate, allyl methacrylate, allyl acrylate, trimethylolpropane, trimethacrylate, trimethylolpropane, triacrylate, and the like. The cross-linking monomers may be employed alone or in admixture thereof. The amount of the cross-linking monomer is selected from the range of 0 to about 20 parts by weight, preferably about 1 to about 10 parts by weight, based on 100 parts by weight of the whole monomer mixture to be subjected to the copolymerization. It is not preferable to use the cross-linking monomer more than the above range because the quality of the produced polymer is fragile.

Further, the silicone-containing styrene may be copolymerized with at least one of other hydrophobic monomers and/or hydrophilic monomers.

The amount of the silicone-containing styrene varies depending on the desired properties of the contact lens or the kind of the hydrophobic monomer and/or hydrophilic monomer to be used. Usually, the preferable amount of it is more than about 20 parts by weight, more preferably, about 30 parts by weight, based on 100 parts by weight of the whole monomer mixture to be subjected to the polymerization. When the amount of the silicone-containing styrene is less than about 20 parts by weight, the obtained monomer cannot exhibit the desired effects.

The above-mentioned hydrophobic monomer is employed for the purpose of increasing the strength of the copolymer, thereby rising the durability as a contact lens. Particularly, alkyl methacrylates and alkyl acrylates are effective for the purpose. Representative examples of the alkyl methacrylates and alkyl acrylates are, for instance, methyl methacrylate, methyl acrylate, ethyl methacrylate, ethyl acrylate, isopropyl methacrylate, isopropyl acrylate, t-butyl methacrylate, t-butyl acrylate, isobutyl methacrylate, isobutyl acrylate, t-amyl methacrylate, t-amyl acrylate, 2-ethylhexyl methacrylate, 2-ethylhexyl acrylate, lauryl methacrylate, lauryl acrylate, cyclohexyl methacrylate, cyclohexyl acrylate, and the like. The alkyl methacrylates and alkyl acrylates may be employed alone or in admixture thereof.

As monomers having the same effects as the alkyl acrylates and alkyl methacrylates, there may also be employed styryl compounds such as styrene, p-methylstyrene, m-methylstyrene, p-t-butylstyrene, m-t-butylstyrene, p-1,1,3,3-tetramethylbutylstyrene, alkyl esters of itaconic acid or crotonic acid, glycidyl methacrylate, glycidyl acrylate, tetrahydrofurfuryl methacrylate, tetrahydrofurfuryl acrylate and benzyl methacrylate, and the like.

In addition to the above-mentioned hydrophobic monomers, hydrophobic monomers such as fluoroalkyl methacrylate, fluoroalkyl acrylate are effective for increasing and maintaining oxygen permeability because of the homopolymers of these monomers themselves having an excellent oxygen permeability. These hydrophobic monomer can be preferably employed since they are also effective for increasing the strength of the copolymer, thereby raising the durability of a lens and improving the chemical and dirt resistance.

Representative examples of the fluoroalkyl methacrylate and fluoroalkyl acrylate are, for instance, 2,2,2-trifluoroethyl methacrylate, 2,2,2-trifluoromethyl acrylate, 2,2,3,3-tetrafluoropropyl methacrylate, 2,2,3,3-tetrafluoropropyl acrylate, 2,2,3,3,3-pentafluoropropyl methacrylate, 2,2,3,3,3-pentafluoropropyl acrylate, 2,2,2-trifluoro-1-trifluoromethylethyl methacrylate, 2,2,2-trifluoro-1-trifluoromethylethyl acrylate, 2,2,3,3-tetrafluoro-t-amyl methacrylate, 2,2,3,3-tetrafluoro-t-amyl acrylate, 2,2,3,4,4,4-hexafluorobutyl methacrylate, 2,2,3,4,4,4-hexafluorobutyl acrylate, 2,2,3,4,4,4-hexafluoro-t-hexyl methacrylate, 2,2,3,4,4,4-hexafluoro-t-hexyl acrylate, 2,2,3,3,4,4,5,5-octafluoropentyl methacrylate, 2,2,3,3,4,4,5,5-octafluoropentyl acrylate, 2,3,4,5,5,5-hexafluoro-2,4-bis(trifluoromethyl)pentyl methacrylate, 2,3,4,5,5,5-hexafluoro-2,4-bis(trifluoromethyl)pentyl acrylate, 2,2,3,3,4,4,5,5,6,6,7,7-dodecafluoroheptyl methacrylate, 2,2,3,3,4,4,5,5,6,6,7,7-dodecafluoroheptyl acrylate, 2-hydroxy-4,4,5,5,6,7,7,7-octafluoro-6-trifluoromethylheptyl methacrylate, 2-hydroxy-4,4,5,5,6,7,7-octafluoro-6-trifluoromethylheptyl acrylate, 2-hydroxy-4,4,5,5,6,6,7,7,8,9,9,9-dodecafluoro-8-trifluoromethylnonyl methacrylate, 2-hydoroxy-4,4,5,5,6,6,7,7,8,9,9,9-dodecafluoro-8-trifluoromethylnonyl acrylate, 2-hydroxy-4,4,5,5,6,6,7,7,8,8,9,9,10,11,11,11-hexadecafluoro-10-trifluoromethylundecyl methacrylate, 2-hydroxy-4,4,5,5,6,67,7,8,8,9,9,10,11,11,11-hexadecafluoro-10-trifluoromethylundecyl acrylate, and the like. The monomers may be employed alone or in admixture thereof.

The amount of the above-mentioned hydrophobic monomers of many species is selected from the range of 0 to about 80 parts by weight, preferably about 10 to about 70 parts by weight, based on 100 parts by weight of the whole monomer mixture to be subjected to the copolymerization. The use of the hydrophobic monomer in an amount larger than the above range is not desirable, since the obtained copolymer loses the observation of the oxygen permeability.

The use of a hydrophilic monomer is effective for imparting a hydrophilic property to the obtained copolymer and for giving a good water wettability to a hard contact lens. Representative examples of the hydrophilic monomer are, for instance, 2-hydroxyethyl methacrylate, 2-hydroxyethyl acrylate, N-vinyl pyrrolidone, dimethylacrylamide, acrylate, methacrylate, and the like. The hydrophilic monomers may be employed alone or in admixture thereof. The amount of the hydrophilic monomer is selected from 0 to about 20 parts by weight, preferably about 5 to about 15 parts by weight, based on 100 parts by weight of the whole monomer mixture to be subjected to the copolymerization. The use of the hydrophilic monomer in an amount larger than the above range is not desirable, since the obtained copolymer becomes water-absorptive and shows a flexibility due to plasticization by impregnated water, thereby losing the characteristics as hard contact lenses.

It is also possible to impart an effective hydrophilic property to the lens surface, for instance, by applying corona discharge or plasma discharge to the obtained hard contact lens or by treating the lens with a strong acid such as hydrochloric acid or nitric acid, instead of or in addition to the use of a hydrophilic monomer.

In case that the above-mentioned plasma discharge is applied, it is particularly suitable to employ gas atmosphere such as air, $O_2$, $N_2$, Ar, He or the mixed gas of these gases for giving a hydrophilic property more efficiently and maintaining the effectiveness. It is desirable to use the gas atmosphere under a condition from 0.1 Torr to 10 Torr.

Silicone-containing styrene employed in the present invention is easy to copolymerize with oxygen permeable monomer such as silicone-containing methacrylate, silicone-containing acrylate. If necessary, a silicone-containing methacrylate or silicone-containing acrylate can be used with the silicone-containing styrene. In that case, in order to obtain the contact lens having higher oxygen permeability than the conventional contact lens and having a sufficient hardness, rigidity and refractive index, an amount of the mixture of the two monomers is more than about 20 parts by weight, preferably about 40 parts by weight, based on 100 parts by weight of the whole monomer mixture to be subjected to the polymerization, and, the ratio of silicone-containing styrene to silicone-containing methacrylate or acrylate is from about 20:80 to about 100:0, preferably from about 30:70 to about 100:0. If the amount of the mixture of the two monomers is less than the above range, a sufficient oxygen permeability is not imparted to the produced polymer.

Examples of the silicone-containing methacrylate and silicone-containing acrylate used in the present invention are, for instance, pentamethyldisiloxanylmethyl methacrylate, pentamethyldisiloxanylmethyl acrylate, pentamethyldisiloxanylpropyl methacrylate, pentamethyldisiloxanylpropyl acrylate, methylbis(trimethylsiloxy)silylpropyl methacrylate, methylbis(trimethylsiloxy)silylpropyl acrylate, tris(trimethylsiloxy)silylpropyl methacrylate, tris(trimethylsiloxy)silylpropyl acrylate, mono[methylbis(trimethylsiloxy)siloxy]bis(trimethylsiloxy)silylpropyl methacrylate, mono[methylbis(trimethylsiloxy)siloxy]bis(trimethylsiloxy)silylpropyl acrylate, tris[methylbis(trimethylsiloxy)siloxy]silylpropyl methacrylate, tris[methylbis(trimethylsiloxy)siloxy]silylpropyl acrylate, methylbis(trimethylsiloxy)silylpropylglycerol methacrylate, methylbis(trimethylsiloxy)silylpropylglycerol acrylate, tris(trimethylsiloxy)silylpropylglycerol methacrylate, tris(trimethylsiloxy)silylpropylglycerol acrylate, mono[methylbis(trimethylsiloxy)siloxy]bis(trimethylsiloxy)silylpropylglycerol methacrylate, mono[methylbis(trimethylsiloxy)siloxy]bis(trimethylsiloxy)silylpropylglycerol acrylate, trimethylsilylethyltetramethyldisiloxanylpropylglycerol methacrylate, trimethylsilylethyltetramethyldisiloxanylpropylglycerol acrylate, trimethylsilylmethyl methacrylate, trimethylsilylmethyl acrylate, trimethylsilylpropyl methacrylate, trimethylsilylpropyl acrylate, methylbis(trimethylsiloxy)silylethyltetramethyldisiloxanylmethyl methacrylate, methylbis(trimethylsiloxy)silylethyltetramethyldisiloxanylmethyl acrylate, tetramethyltriisopropylcyclotetrasiloxanylpropyl methacrylate, tetramethyltriisopropylcyclotetrasiloxanylpropyl acrylate, tetramethyltriisopropylcyclotetrasiloxybis(trimethylsiloxy)silylpropyl methacrylate, tetramethyltriisopropylcyclotetrasiloxybis(trimethylsiloxy)silylpropyl acrylate, and the like. The monomers may be employed alone or in admixture thereof.

The use of the silicone-containing methacrylate or the silicone-containing acrylate with the silicone-containing styrene can advantageously reduce the cost for production of oxygen permeable hard contact lens, because of reducing the material cost for further improving of a visible ray permeability or improving and maintaining of an oxygen permeability.

It is also possible to employ an ultraviolet ray absorbing monomer for giving a function of ultraviolet absorption in the contact lens in the present invention, or to copolymerize in the presence of a dyestuff for coloring the lens.

The polymerization of a monomer mixture can be readily carried out by any methods usually employed in the field of this art. For instance, the polymerization is carried out at a temperature ranging from room temperature to about 130° C. by employing free radical polymerization initiators as used in the polymerization of usual unsaturated hydrocarbon compounds. Examples of the free radical polymerization initiator are, for instance, benzoyl peroxide, azobisisobutyronitrile, azobisdimethyl-valeronitrile, and the like. The polymerization initiators may be employed alone or in admixture thereof. The polymerization initiator is employed in an amount of 0.01 to 1 part by weight per 100 parts by weight of the whole monomer mixture.

The shaping of the copolymer into contact lenses can be made by usual methods. For instance, polymerization may be conducted in a mold corresponding to a shape of a contact lens to give a copolymer having a contact lens shape directly. The thus obtained contact lens may be further subjected to a mechanical finishing, as occasion demands. Also, the polymerization may be conducted in an appropriate mold or vessel to give a lens material in a form of button, plate or rod, and the lens material may be then subjected to a usual mechanical processing such as cutting or polishing to give a contact lens of a desired shape.

The oxygen permeable contact lens of the present invention has the following excellent properties. That is to say, since the lens is made of a material having an improved fragility as well as hardness and rigidity desired for hard contact lenses, the lens has an improved durability and also it is possible to maintain a constant lens contour, whereby a stable corrected visual power can be obtained. Also, since the hard contact lens of the present invention has a higher oxygen permeability than a conventional oxygen permeable hard contact lens, it is possible to sufficiently maintain the metabolism of the corneal tissue even if lenses are worn for a long period of time. Still more, since this contact lens has a high refractive index, it is possible to produce thinner lens at the same degrees, therefore wearing sensation and oxygen permeability become better.

The present invention is more specifically described and explained by means of the following Examples in which all parts are by weight unless otherwise noted. It is to be understood that the present invention is not limited to the Examples, and various changes and modifications may be made in the invention without departing from the spirit and scope thereof.

EXAMPLE 1

There were thoroughly admixed 97 parts of trimethylsilylstyrene, 3 parts of ethylene glycol dimethacrylate and 0.25 part of 2,2'-azobis(2,4-dimethylvaleronitrile) as a polymerization initiator. The mixture was placed in a glass test tube, and after stoppering the test tube, the polymerization was stepwise carried out in a circulation type thermostat at 35° C. for 41.5 hours and in a circulation type dryer at 50° C. for 6 hours, at 60° C. for 1.5 hours, at 70° C. for 1.5 hours, at 80° C. for 1.5 hours, at 90° C. for 1 hour, at 100° C. for 1 hour, at 110° C. for 1 hour, at 120° C. for 1 hour and at 130° C. for 1.5 hours. The obtained colorless transparent copolymer was cut and subjected to mechanical processing such as grinding and polishing to give a hard contact lens.

In the Examples, physical properties of contact lenses were measured according to the following methods.

(1) Oxygen permeability (cc.cm/cm$^2$.sec.mmHg) is measured at 35° C. in 0.9% physiological saline by a film-oxygen gas permeameter of Seikaken type made by Rikaseiki Kogyo Kabushiki Kaisha with respect to a specimen having a diameter of 12.7 mm and a thickness of 0.2 mm.

(2) Vickers hardness (7.5 NHv) is measured in an air-conditioned room of 20° C. and 45%RH by a hardness tester made by Kabushiki Kaisha Akashi Seisakusho with respect to a specimen having a diameter of 12.7 mm and a thickness of 4.0 mm.

(3) Refractive index ($n_D{}^{20}$) is measured in an air-conditioned room of 20° C. and 45% RH by an Erma new type Abbe's refractometer made by Erma Optical Works Co., Ltd. with respect to a specimen having a diameter of 12.7 mm and a thickness of 4.0 mm.

(4) Visible ray percent transmission (%) is measured in a distilled water of 20° C. by Automatic Recording Spectrophotometer UV-240 made by Shimadzu Corporation with respect to a specimen having a diameter of 12.7 mm and a thickness of 0.50 mm.

Physical properties of the lens were measured. The results are shown in Table 1.

COMPARATIVE EXAMPLE

The procedures of Example 1 were repeated except that 97 parts of trimethylsilylpropyl methacrylate, which is a kind of silicone-containing methacrylate, represented by the formula:

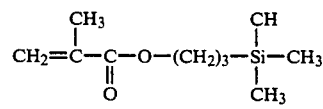

was employed instead of trimethylsilylstyrene which was used in Example 1.

The results of the measurement of physical properties of the obtained contact lens are also shown in Table 1.

TABLE 1

|  | Example 1 | Comparative Example 1 |
|---|---|---|
| Oxygen permeability [cc · cm/cm$^2$ · sec · mmHg] | 6.05 × 10$^{-10}$ | 2.93 × 10$^{-10}$ |
| Vickers hardness | 17.44 | 1.70 |
| Refractive index [$n_D{}^{20}$] | 1.530 | 1.478 |
| Visible ray percent transmission (%) | >97 | >97 |

EXAMPLE 2

The procedures of Example 1 were repeated except that 50 parts of trimethylsilylstyrene, 39 parts of dodecafluoropentyl methacrylate, 11 parts of trimethylolpropane trimethyacrylate and 0.25 part of 2,2'-azobis(2,4-dimethylvaleronitrile) as a polymerization initiator.

The results of the measurement of physical properties of the obtained contact lens are shown in Table 2.

Physical properties of a conventional oxygen permeable hard contact lens (commercially available under the commercial name "Menicon O$_2$" made by Toyo Contact Lens Co., Ltd.) are also shown in Table 2 for comparison.

TABLE 2

|  | Example 2 | Menicon O$_2$ |
|---|---|---|
| Oxygen permeability [cc · cm/cm$^2$ · sec · mmHg] | 4.24 × 10$^{-10}$ | 1.05 × 10$^{-10}$ |
| Vickers hardness | 15.17 | 8.6 |
| Refractive index [$n_D{}^{20}$] | 1.485 | 1.481 |

TABLE 2-continued

|  | Example 2 | Menicon O$_2$ |
|---|---|---|
| Visible ray percent transmission (%) | >99 | >98 |

As it is shown in Tables 1 and 2, the oxygen permeable hard contact lens in the present invention has a far higher oxygen permeability than the conventional contact lens as well as desirable hardness and rigidity, and also has an excellent refractive index.

EXAMPLES 3 TO 19

The procedures of Example 1 were repeated except that the kinds and amounts of components in the polymerization were changed as shown in Table 3 to give hard contact lenses.

The main results of the measurement of physical properties of the obtained lenses are shown in Table 3.

EXAMPLE 20

Brass was subjected to a mechanical process such as cutting or polishing to give a concave and a convex molds which have predetermined lens contour.

The polymerized mixture, mixed with each kinds and amounts of components shown is Table 3, was injected into the above-mentioned concave mold quietly. The convex mold was put on it, and the concave and the convex molds were clipped by a clamp, as watching that air bubbles were not contained, and fixed. The heat-polymerization was stepwise carried out in a hot-air circulation type dryer at 50° C. for 3 hours, at 60° C. for 1.5 hours, at 70° C. for 1.5 hours, at 80° C. for 1.5 hours, at 90° C. for 1 hour, at 100° C. for 1 hour and 110° C. for 1 hour, it was cooled at a room temperature. The clamp was removed and the concave and the convex molds were separated by soaking in distilled water to take out the desired oxygen permeable hard contact lens. The main results of the measurement of physical properties of the obtained lens are also shown in Table 3.

TABLE 3

| Ex. No. | 3 | 4 | 5 | 6 | 7 | 8 | 9 | 10 | 11 |
|---|---|---|---|---|---|---|---|---|---|
| Components (parts) | | | | | | | | | |
| silicone-containing styrene | | | | | | | | | |
| SK5100 | 60 | 45 | 40 | 42.5 | 40 | 50 | 30 | 30 | 30 |
| SK5101 | — | — | — | — | — | — | — | — | — |
| hydrophobic monomer | | | | | | | | | |
| MMA | 35 | — | — | 10 | 20 | — | 10 | 10 | — |
| t-BuMA | — | 45 | — | — | — | — | — | — | 10 |
| LMA | — | — | 45 | — | — | — | — | — | — |
| 3 FEMA | — | — | — | 40 | — | — | 30 | 30 | 30 |
| F$_{12}$MA | — | — | — | — | — | — | — | — | — |
| F$_{11}$GMA | — | — | — | — | 30 | — | — | — | — |
| St | — | — | — | — | — | 40 | — | — | — |
| hydrophilic monomer | | | | | | | | | |
| N—VP | — | — | — | — | — | — | — | — | — |
| silicone-containing methacrylate | | | | | | | | | |
| X-22-5001 | — | — | — | — | — | — | 20 | — | 10 |
| X-22-154 | — | — | — | — | — | — | — | 20 | 10 |
| cross-linking polymer | | | | | | | | | |
| EDMA | 5 | 10 | 15 | 7.5 | — | 10 | 10 | 10 | 10 |
| TMP | — | — | — | — | 10 | — | — | — | — |
| polymerization initiator | | | | | | | | | |
| V-65 | 0.25 | 0.25 | 0.25 | 0.25 | 0.25 | 0.25 | 0.25 | 0.25 | 0.25 |
| Physical properties | | | | | | | | | |
| Oxygen permeability DK × 10$^{-10}$ [cc · cm/cm$^2$ · sec · mmHg] | 1.50 | 2.06 | 2.27 | 2.06 | 2.00 | 2.12 | 3.90 | 2.26 | 3.40 |
| Vickers hardness [7.5 NHv] | 19.18 | 17.67 | 5.18 | 17.55 | 20.73 | 20.01 | 13.33 | 13.93 | 12.76 |
| Refractive index [n$_D^{20}$] | 1.519 | 1.501 | 1.513 | 1.486 | 1.490 | 1.553 | 1.474 | 1.482 | 1.475 |
| Visible ray percent transmission (%) | 98.0 | 99.0 | 99.2 | 99.0 | 98.8 | 97.5 | 99.5 | 99.5 | 99.4 |

| Ex. No. | 12 | 13 | 14 | 15 | 16 | 17 | 18 | 19 | 20 |
|---|---|---|---|---|---|---|---|---|---|
| Components (parts) | | | | | | | | | |
| silicone-containing styrene | | | | | | | | | |
| SK-5100 | — | — | — | — | — | 20 | 15 | 30 | — |
| SK-5101 | 50 | 45 | 42.5 | 40 | 30 | 30 | 30 | — | 97 |
| hydrophobic monomer | | | | | | | | | |
| MMA | 45 | — | 10 | — | 10 | 10 | 5 | — | — |
| t-BuMA | — | 40 | — | — | — | — | 5 | — | — |
| LMA | — | — | — | — | — | — | — | — | — |
| 3FEMA | — | — | 40 | — | 30 | 30 | 10 | 20 | — |
| F$_{12}$MA | — | — | — | 40 | — | — | 5 | — | — |
| F$_{11}$GMA | — | — | — | — | — | — | — | — | — |
| St | — | — | — | — | — | — | 5 | — | — |
| hydrophilic monomer | | | | | | | | | |
| N—VP | — | 5 | — | 10 | — | — | 5 | — | — |
| silicone-containing methacrylate | | | | | | | | | |
| X-22-5001 | — | — | — | — | 20 | — | 10 | 40 | — |
| X-22-154 | — | — | — | — | — | — | — | — | — |
| cross-linking polymer | | | | | | | | | |
| EDMA | 5 | 10 | 7.5 | — | 10 | 10 | 5 | 10 | 3 |

TABLE 3-continued

| | | | | | | | | | |
|---|---|---|---|---|---|---|---|---|---|
| TMP | — | — | — | 10 | — | — | 5 | — | — |
| polymerization initiator V-65 | 0.2 | 0.2 | 0.2 | 0.2 | 0.2 | 0.2 | 0.2 | 0.15 | 0.2 |
| Physical properties | | | | | | | | | |
| Oxygen permeability DK × $10^{-10}$ [cc · cm/cm² · sec · mmHg] | 2.51 | 3.45 | 5.15 | 4.49 | 5.89 | 4.41 | 4.51 | 7.60 | 12.69 |
| Vickers hardness [7.5 NHv] | 12.27 | 10.64 | 8.38 | 7.11 | 8.36 | 12.39 | 10.50 | 9.60 | 0.94 |
| Refractive index [$n_D^{20}$] | 1.486 | 1.479 | 1.457 | 1.456 | 1.456 | 1.477 | 1.486 | 1.471 | 1.481 |
| Visible ray percent transmission (%) | 98.9 | 99.4 | 99.6 | 99.2 | 99.8 | 99.4 | 99.2 | 98.9 | 98.5 |

(note):
SK-5100: Trimethylsilyl styrene
SK-5101: Bis(trimethylsiloxy)methylsilyl styrene
X-22-5001: Tris(trimethylsiloxy)silylpropyl methacrylate
X-22-154: Bis(trimethylsiloxy)methylsilylpropylglycerol methacrylate
MMA: Methyl methacrylate
t-BuMA: tert-Butyl methacrylate
LMA: Lauryl methacrylate
3FEMA: Trifluoroethyl methacrylate
$F_{12}$MA: Dodecafluoropentyl methacrylate
$F_{11}$GMA: 2-Hydroxy-4,4,5,5,6,7,7,7-octafluoro-6-trifluoromethylheptyl methacrylate
St: Styrene
N—VP: N—vinylpyrrolidone
EDMA: Ethyleneglycol dimethacrylate
TMP: Trimethylolpropane trimethacrylate
V-65: 2,2'-Azobis-(2,4-dimethylvaleronitrile)

What we claim is:

1. An oxygen permeable hard contact lens made of a polymer formed from not less than about 20 parts by weight of at least one monomer, based on 100 parts by weight of the whole polymer, said at least one monomer comprising a styrene monomer containing a silyl or siloxanyl group and having the formula (I):

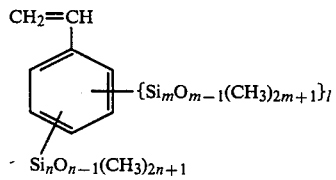

wherein l is 0 or 1, and n and m are integers of 1 to 15.

2. The contact lens of claim 1, wherein said polymer is a polymer formed from said styrene monomer containing a silyl or siloxanyl group having at most 15 silicon atoms.

3. The contact lens of claim 1, wherein said polymer is a copolymer formed from
    (a) said styrene monomer containing a silyl or siloxanyl group having at most 15 silicon atoms and
    (b) hydrophobic monomer and/or hydrophilic monomer.

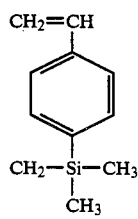

4. The contact lens of claim 1, wherein l is 0, n is an integer of 1 to 15.

5. The contact lens of claim 1, wherein said styrene monomer having the silyl or siloxanyl group is a compound of the formula (II):

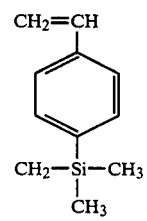

6. The contact lens of claim 1, wherein said styrene monomer having the silyl or siloxanyl group is a compound of the formula (III):

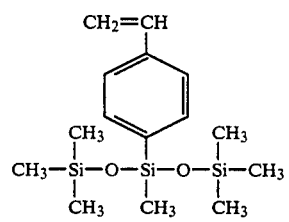

7. The contact lens of claim 1, wherein said styrene monomer having the silyl or siloxanyl group is a compound of the formula (IV):

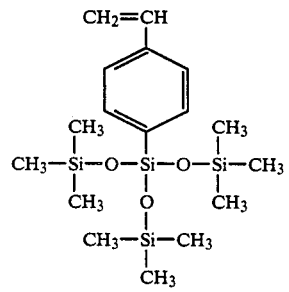

8. The contact lens of claim 1, wherein said siloxanyl group is a branched or linear siloxanyl group.

9. The contact lens of claim 1, wherein said siloxanyl group is a cyclic structure.

10. The contact lens of claim 3, wherein component (b) of said copolymer contains at least one of 0 to about 80 parts by weight of said hydrophobic monomer and 0 to about 20 parts by weight of said hydrophilic monomer, based upon 100 parts by weight of the whole copolymer.

11. The contact lens of claim 3, wherein said component (b) of said copolymer contains at least one of about 10 to about 80 parts by weight of said hydrophobic monomer and about 5 to about 20 parts by weight of said hydrophilic monomer, based upon 100 parts by weight of the whole copolymer.

12. The contact lens of claim 11, wherein component (a) of said copolymer is present in an amount from about 20 to about 97 parts by weight, based upon 100 parts by weight of the whole copolymer.

13. The contact lens of claim 1, wherein $l=1$.

* * * * *